Patented July 29, 1941

2,251,070

UNITED STATES PATENT OFFICE 2,251,070

CHEWING GUM

Jacob M. Schantz, Wilmington, Del., assignor to Hercules Powder Company, Wilmington, Del., a corporation of Delaware No Drawing. Application December 27, 1940, Serial No. 372,006

10 Claims. (Cl. 99—135)

This invention relates to chewing gum and, more particularly to chewing gum comprising an improved resinous constituent.

In my copending application, Serial No. 340,472, filed June 14, 1940, there is disclosed the use in chewing gum of polyhydric alcohol esters of hydrogenated rosin, and specifically the glycerol ester. While the use of such an ester gives rise to numerous advantages over previously used resins, the chewing gum produced is not entirely satisfactory with regard to chemical and physical characteristics and frequently develops objectionable tackiness or stickiness upon chewing.

This invention has as an object the production of improved chewing gum material. Another object is to produce a softer and more easily chewable composition which is free from objectionable tackiness, taste and odor. Another object is to produce more stable chewing gum compositions. Other objects will more fully hereinafter appear.

I have discovered that these objects may, in general, be accomplished by the use in chewing gum of a polybasic acid modified polyhydric alcohol ester of hydrogenated rosin. By "polybasic acid modified" herein, I mean modified with either the acid itself or the acid anhydride, it being understood that where the acid itself is employed in the preparation of the resin, it is frequently converted to the acid anhydride by the heat employed to effect the esterification. The polybasic acid gives resins of higher melting point, and combines with any free resin acids and with any free polyhydric alcohol. Where maleic acid or equivalent unsaturated acid is used as the polybasic acid, it combines with any unsaturated portion of the hydrogenated rosin thus adding further to the stability of the product and greatly increasing the complexity of inter-reactions in the resin.

It is preferred to use maleic acid as the modifying polybasic acid. Instead of maleic acid, however, there may be employed other polybasic acids such as phthalic, succinic, malic, tartaric, fumaric, citric, glutaric, adipic, pimelic, suberic, azelaic, sebacic, itaconic, etc.

As the polyhydric alcohol component of the resin, I prefer to use a polyhydric alcohol having from 3 to 6 carbon atoms and from 3 to 6 hydroxyl groups each on separate of said carbon atoms, such as glycerine, butantriol-1, 2, 3, pentaglycerol (methyl trimethylol methane), trimethylol methane ("isobutyl glycerine"), erythritol, pentaerythritol, diglycerol, mono-anhydro derivatives (inner ethers) of hexahydric alcohols such as mannitan, sorbitan, dulcitan, iditan, talitan, pentahydric alcohols such as adonitol, arabitol, xylitol, rhamnitol, hexahydric alcohols such as mannitol, sorbitol, dulcitol, iditol, talitol, etc. Less preferably, I may use glycol esters such as esters of ethylene glycol, diethylene glycol, trimethylene glycol, triethylene glycol, propylene glycol, butylene glycol, etc., although on account of the lower melting point of the esters and the reported toxicity of certain of the glycols, such esters are not preferred. I may use esters of polyhydric alcohols of more than six carbon atoms, such as perseitol, lactositol, volemitol, enneaheptitol, etc. I may use esters of the di-anhydro inner ethers of the hexahydric alcohols such as mannide, sorbide, dulcide, idide, talide, etc. Excellent results have been obtained using the esters with glycerine, pentaerythritol, the hexahydric alcohols and the mono- or di-anhydro inner ethers of the hexahydric alcohols which may conveniently be formed during the resin-forming reaction. Since glycerine, pentaerythritol and the hexahydric alcohols are commerically available at economical prices, their use is additionally advantageous. Instead of straight polyhydric alcohols, I may, though less preferably, use other non-toxic saturated aliphatic compounds having groups other than hydroxyl groups such as glucose, sucrose, polyhydroxy monobasic carboxylic acids such as glyceric acid, gluconic acid, mucic acid, saccharic acid, etc.

I prefer to employ hydrogenated rosin wherein the unsaturation of the rosin nucleus has been reduced by at least 50% of the theoretical for the double bonds contained in the abietyl radical, by combination with hydrogen. This means that on an average at least one of the two double bonds in the rosin nucleus has been saturated with hydrogen. The more saturated the rosin nucleus, the more desirable the resulting ester is for use in chewing gum. In some cases, I may employ rosin which is saturated to the extent of 95% or even 100% of theoretical.

The hydrogenated rosin may have been previously subjected to suitable refining processes to reduce its color, taste and odor, such as known processes of refining with selective solvents such as furfural, etc. or with selective adsorbents such as activated clay, activated carbon, fuller's earth, etc. Likewise, the rosin may have been similarly refined prior to its hydrogenation. Preferably, the hydrogenated rosin employed is of a grade of at least WG on the rosin color scale.

The polybasic acid modified resinous ester may be made by heating a mixture of the polybasic acid or polybasic acid anhydride, the polyhydric alcohol and the hydrogenated rosin to a temperature of from 275° C. to 300° C. for a period of time of say 3 to 6 hours, preferably while maintaining the mixture in an inert atmosphere such as carbon dioxide. The resinous reaction mixture is preferably treated to remove volatile components therefrom as by vacuum distillation, sparging with superheated steam or other inert gas, jetting with carbon dioxide, etc. If desired, the resinous product may be refined to lower its color, although usually this will be unnecessary.

The relative amounts of polyhydric alcohol and acidic materials should be such that the resin has an acid number of not above about 50 and preferably not over about 20. This may be effected by employing not over one equivalent of acid constituents (hydrogenated rosin and polybasic acid or anhydride) per hydroxyl group in the polyhydric alcohol available for esterification. In the case of glycerol, I may use up to 3 equivalents of acidic materials per mol of glycerol. In the case of pentaerythritol, I may use up to 4 equivalents of acid reactants per mol of pentaerythritol. In the case of the hexahydric alcohols, because of the phenomenon of inner ether formation which makes available less than six hydroxyl groups per mol, I prefer to use not over about 4 equivalents of acid per mol of hexahydric alcohol or inner ether thereof. However, larger amounts of acid than theoretical may be used.

Preferably the polybasic acid mol fraction of the total acid component employed is from about 0.10 to about 0.30. Excellent results are obtained with a figure of about 0.16. The use of mol fractions of polybasic acid within the indicated range results in a resin which is tack-free of light color, of high melting point, odorless and tasteless, and which is eminently suited for use as the resinous constitutent of chewing gum.

Instead of preparing the resin by simply heating the reactants together, the components may be reacted in various orders, for example by reacting the hydrogenated rosin with the polybasic acid followed by addition of and reaction with the polyhydric alcohol.

The resin employed in the present invention is characterized by being a complex reaction product of previously hydrogenated rosin, a polyhydric alcohol and a polybasic acid wherein there exist combinations between the hydrogenated rosin and polyhydric alcohol, between the polyhydric alcohol and the polybasic acid, and between all three components. These interreactions may be brought about to a maximum degree by reacting all of the raw ingredients simultaneously by commingling the three unreacted materials in the cold and heating the mixture under esterifying conditions. In the case where maleic acid or anhydride or similar unsaturated acid is used, a much more complex reaction ensues, the maleic acid combining with the unsaturated bonds left in the hydrogenated rosin.

The resinous reaction product may, then, be said to be a double ester of the polyhydric alcohol with hydrogenated rosin and with the polybasic acid.

In accordance with the present invention, the resinous ester described above is incorporated in the chewing gum in any desired manner. Any of the usual chewing gum formulations may be employed, the resin of the present invention replacing a part of all of the resinous component heretofore employed. While typical and preferred embodiments of the invention will be described, the invention in its broad aspects is by no means limited thereto.

Use of the polybasic acid modified polyhydric alcohol ester of the present invention results in a greater ease of obtaining chewing gum of the desired physical characteristics, greater uniformity, greater ease of chewing, less tackiness, better resistance to deterioration as by oxidation or other chemical change, greater freedom from taste or odor, better color and better retention of flavor.

The resin is preferably employed in conjunction with a rubbery or rubber-like material such as gum chicle, crepe rubber, rubber latex, guayule rubber, gutta percha, gutta siak, jelutong. balata, factice, or the like. Natural rubber either as such or in the form of an aqueous dispersion, such as rubber latex may desirably be employed as the rubber constituent of the chewing gum base. Synthetic rubber and latices made therewith may be used, such as, for example, polychlorobutadiene, polydimethylbutadiene, polybutadiene, etc. It is preferred to use so-called "synthetic chicle," that is, low grade natural vegetable rubber-like material too high in resin content (resin content ranging from about 25% and usually from about 40% to about 90%) to be useful for rubber, such as materials selected from the group consisting of gutta percha, jelutong, balata, gum tuno, namaqualand rubber (from *Euphorbia drageana*), almeidana or euphorbia gum, abba rubber, and inferior guttas such as gutta siak, gutta cotie, gutta kay, gutta hang kang, gutta jangkar, gutta sundik, gutta soh, gutta susu, gutta penang, yellow gutta, and related materials, and mixtures of the foregoing materials with one another or with gum chicle which is such a low grade natural rubber-like material. The resinous esters of the present invention are completely miscible or compatible with the rubbery or rubber-like materials named. Instead of using a single rubbery or rubber-like material, mixtures of two or more thereof may be employed. The rubber-like material may be employed in an amount such that the ratio thereof to the resin ranges from about 20 to 1 to about 1 to 10 and preferably from about 4 to 1 to about 1 to 4. Equal parts by weight of the rubbery or rubber-like material and the resinous ester form a very desirable chewing gum base.

In addition to the rubbery or rubber-like material and the resinous double ester described above, the chewing gum base may embody other resins, natural or synthetic, such as ordinary rosin, ester gum, cumarone resin, pontianak resin, copal gum, kauri gum, damar gum, sweet bay gum, spruce gum, balsams and the like. It is preferred, however, to keep the percentages of these other resins at a minimum.

The chewing gum base may embody an oil softening agent, such as petrolatum, beef stearin, vegetable oil, such as cottonseed oil, olive oil, etc.; petroleum oil, such as water white mineral oil and the like, or hydrogenated vegetable oil, such as hydrogenated cottonseed oil which is solid at ordinary temperature, etc., the oily softening agent preferably being present in limited amount, say not over about 25% of the chewing gum base, so as to impart no objectionable oily characteristic or flavor to the chewing gum.

In addition, it is frequently desirable to incorporate in the chewing gum base a wax or wax-like material such as paraffin wax, beeswax, stearic acid, candelilla wax, ceresin wax, etc., in amount up to about 85% of the chewing gum base.

In addition, it is frequently desirable to incorporate small amounts of water in the composition, this being particularly desirable where the rubber-like material is in solid form. The use of water in this manner produces a mellowing and softening effect on the gum. The amount of water incorporated in this manner and left in the chewing gum base may vary up to say 10% by weight. Where a latex of the rubbery material is employed water may be left in the chewing gum base in such amounts.

Where a wax such as paraffin is present in preponderant amount, say between about 50% and about 85% of the composition and preferably between about 65% and about 75% of the composition, convenient ranges of proportions of the remaining ingredients are from about 9% to about 18% of rubbery or rubber-like material, from about 1% to about 3% of water, and from about 3.5% to about 15% of the resinous ester such as maleic modified polyhydric alcohol ester of hydrogenated rosin.

The amount of resinous ester incorporated in chewing gum compositions prepared in accordance with the present invention will usually not exceed about 25% by weight.

The chewing gum base may be prepared by mixing the constituents together in any suitable manner so as to obtain a homogeneous intimate mixture as by milling them on a roll mill at some suitable elevated temperature, say 90° C. to 135° C. in the conventional manner. Alternatively, the ingredients may be masticated in a Banbury mixer or the like. Where a wax predominates, the wax may be melted at say 125–135° C., and the rubber dissolved therein followed by addition of the other ingredients.

Following are specific examples of the preparation of resins to be used in accordance with the present invention. The hydrogenated rosin used had a saturation of 70% of the theoretical, an acid number of 168, a drop melting point of 79° C., and a color of 5 amber (X).

Example 1

*Maleic modified sorbitol ester of hydrogenated rosin*

|  | Per cent by weight |
|---|---|
| Hydrogenated rosin | 75.8 |
| Sorbitol (crystalline) | 20.2 |
| Maleic anhydride | 4.0 |

The hydrogenated rosin was charged into a reaction vessel equipped with a carbon dioxide bubbling tube and an air reflux condenser. The hydrogenated rosin was melted and carried to 120° C., with a moderate stream of carbon dioxide bubbling therethrough. The mixed maleic anhydride and sorbitol were charged and the temperature was raised to 295° C. at the rate of 1° C. per minute. The mass was maintained at this temperature, 295° C. for 3 hours. Carbon dioxide was bubbled through the reaction mixture throughout. The reaction mixture was then sparged with carbon dioxide for 15 minutes. A resin with an acid number of 40.5, a color of 80 amber, and a softening point of 117° C. (Hercules drop method) resulted. The ratio of equivalents of total acid components to mols of sorbitol employed was 2.25 and the maleic acid mol fraction of the total acid component was 0.153.

Example 2

*Maleic modified glyceryl ester of hydrogenated rosin*

|  | Per cent by weight |
|---|---|
| Hydrogenated rosin | 84.6 |
| Glycerine | 11.0 |
| Maleic anhydride | 4.4 |

The preparation was the same as for Example 1 except that the air condenser was replaced with a hot water reflux condenser. The product had an acid number of 15, a color of 33 amber and a softening point (Hercules method) of 107° C. The ratio of equivalents of total acid components to mols of glycerine was 2.34 and the maleic acid mol fraction of total acid components was 0.153.

Example 3

*Maleic modified pentaerythritol ester of hydrogenated rosin*

|  | Per cent by weight |
|---|---|
| Hydrogenated rosin | 88.0 |
| Pentaerythritol | 7.32 |
| Maleic anhydride | 4.68 |

The hydrogenated rosin was charged into a reaction vessel equipped with a carbon dioxide bubbling tube and air reflux condenser. The hydrogenated rosin was melted and carried to 120° C. The maleic anhydride was added and a moderate stream of carbon dioxide was passed through the reaction mass. The temperature was raised to 200° C. and held for 30 minutes. The pentaerythritol was then added and the temperature raised to 295° C. and maintained at that level for 5 hours and one-half. The resin was then sparged with carbon dioxide for 15 minutes. The product had an acid number of 39, a color of 80 amber, and a softening point (Hercules method) of 99.5° C. The ratio of equivalents of total acid components to mols of pentaerythritol was 5.3 and the maleic acid mol fraction of total acid components was 0.153.

Following are specific examples of chewing gums prepared in accordance with the invention. The use of ester gum in the examples is optional. When it is used, amounts up to 12% can be used, but it is preferred to use amounts up to 5%. The use of cumarone indene resin is optional. When used, amounts of from 1 to 5% are preferred although satisfactory compositions may be produced containing as high as 10%. The use of beeswax is likewise optional. Satisfactory compositions may be produced using amounts ranging from 1% to 15%, although it is preferred to use amounts varying from 1 to 10%. While it is preferred to use amounts of water varying from 1% to 3%, satisfactory compositions are produced using amounts up to 6%. While it is preferred to prepare the compositions at not above about 145° C. the temperature may be raised to as high as 180° C. Higher temperatures than 180° C. are not desirable in that the final product may be considerably darkened and possess an undesirable odor and taste.

|  | Example No.— | | |
|---|---|---|---|
|  | 4 | 5 | 6 |
|  | Percent by weight | Percent by weight | Percent by weight |
| Paraffin (M. P. 125° F.) | 69.2 | 69.2 | 69.2 |
| Crepe rubber | 13.8 | 13.8 | 13.8 |
| Ester gum | 4.1 | | |
| Cumarone indene resin (known as cumar wax W-½) | 2.5 | | 2.5 |
| Beeswax | 4.1 | 4.1 | |
| Water | 2.2 | 2.2 | 2.2 |
| Maleic modified sorbitol ester of hydrogenated rosin (of Example 1) | 4.1 | 10.7 | 12.3 |

The paraffin was melted and while held at 125–135° C., the crepe rubber in small pieces was dissolved therein. The ester gum was then added followed by the cumarone indene resin and then the beeswax. When a smooth paste resulted, the maleic modified resin was stirred in. Throughout, the temperature of the mixture was held at 125–135° C. The mix was then allowed to cool. When the temperature reached 80° C., the water was stirred in. Smooth tan-colored, tasteless and odorless mixtures resulted in all cases. The resulting bases were much more easily chewable than identical compositions made with the corresponding maleic modified sorbitol ester of WG wood rosin.

Examples 7 to 9

These formulations were identical with those of Examples 4 to 6 except that in place of the sorbitol ester, there was used the glycerol ester of Example 2. The resulting chewing bases had characteristics similar to those of Examples 4 to 6.

Examples 10 to 12

Examples 4 to 6 were duplicated except that the maleic modified pentaerythritol ester of hydrogenated rosin of Example 3 was employed in place of the sorbitol ester. The compositions exhibited similar properties insofar as ease of chewing, lack of taste, lack of odor, etc. were concerned.

The usual sweetening agents, flavorings, colors, fillers, etc. may be incorporated in the chewing gum base prepared as described in the foregoing.

Several advantages result from the use of the polybasic acid modified polyhydric alcohol esters of hydrogenated rosin in chewing gum. The composition is softer and more easily chewable. Compositions produced by the use of corresponding esters of ordinary rosin were objectionably hard and did not possess such desirable properties. Another advantage is the non-oxidizability under ordinary conditions, of the composition. Another advantage is the production of a product that is reproducible as compared with the lack of uniformity observed in the ordinarily used gum chicle and in the compositions made therewith. The latter is particularly true of the chicle-free formulations of the foregoing specific examples.

It will be understood that the details and examples hereinbefore set forth are illustrative only and that the invention as broadly described and claimed is in no way limited thereby.

What I claim and desire to protect by Letters Patent is:

1. Chewing gum material comprising a polybasic acid modified polyhydric alcohol ester of hydrogenated rosin.
2. Chewing gum material comprising a polybasic acid modified glycerine ester of hydrogenated rosin.
3. Chewing gum material comprising a polybasic acid modified pentaerythritol ester of hydrogenated rosin.
4. Chewing gum material comprising a polybasic acid modified ester of hydrogenated rosin with a polyhydric alcohol selected from the group consisting of hexahydric alcohols and inner ethers of the hexahydric alcohols.
5. Chewing gum material comprising a maleic acid modified sorbitol ester of hydrogenated rosin.
6. Chewing gum material comprising a maleic acid modified polyhydric alcohol ester of hydrogenated rosin, said polyhydric alcohol having 3 to 6 carbon atoms and 3 to 6 hydroxyl groups each on separate of said carbon atoms, and said rosin being saturated at least to the extent of 50% of the theoretical for two double bonds, said ester having an acid number of not over about 50, the maleic acid mol fraction of the total combined acid in said ester being from about 0.05 to about 0.30.
7. A chewing gum base containing by weight from about 3.5% to about 15% of a maleic-modified polyhydric alcohol ester of hydrogenated rosin.
8. A chewing gum base containing by weight from about 65% to about 75% of paraffin wax, from about 9% to about 18% of rubbery material, from about 1% to about 3% of water, and from about 3.5% to about 15% of a maleic-modified polyhydric alcohol ester of hydrogenated rosin.
9. A chewing gum base containing by weight 69.2% of paraffin wax, 13.8% of crepe rubber, 2.2% of water, from 4.1% to 12.3% of a maleic-modified polyhydric alcohol ester of hydrogenated rosin, from 0 to 4.1% of ester gum, from 0 to 2.5% of cumarone-indene resin, from 0 to 2.5% of beeswax, said last three ingredients totaling from 2.5% to 10.7%.
10. Chewing gum material comprising a maleic-modified ester of hydrogenated rosin with a polyhydric alcohol selected from the group consisting of the hexahydric alcohols, and the inner ethers of the hexahydric alcohols.

JACOB M. SCHANTZ.